United States Patent
Pelletier

(10) Patent No.: US 10,197,753 B2
(45) Date of Patent: Feb. 5, 2019

(54) LEAKTIGHT AND DISMOUNTABLE CONNECTOR FOR OPTICAL FIBRES

(71) Applicant: ZODIAC AEROSAFETY SYSTEMS, Plaisir (FR)

(72) Inventor: Yannick Pelletier, Loches (FR)

(73) Assignee: ZODIAC AEROSAFETY SYSTEMS, Plaisir (FR)

( * ) Notice: Subject to any disclaimer, the term of this patent is extended or adjusted under 35 U.S.C. 154(b) by 0 days.

(21) Appl. No.: 15/489,991

(22) Filed: Apr. 18, 2017

(65) Prior Publication Data

US 2017/0299827 A1  Oct. 19, 2017

(30) Foreign Application Priority Data

Apr. 19, 2016  (FR) ..................... 16 53455

(51) Int. Cl.
*G02B 6/38* (2006.01)
*G02B 6/42* (2006.01)

(52) U.S. Cl.
CPC .......... *G02B 6/4251* (2013.01); *G02B 6/387* (2013.01); *G02B 6/3816* (2013.01); *G02B 6/3885* (2013.01); *G02B 6/3894* (2013.01); *G02B 6/3897* (2013.01)

(58) Field of Classification Search
None
See application file for complete search history.

(56) References Cited

U.S. PATENT DOCUMENTS

| 4,615,547 | A | 10/1986 | Sutcliffe et al. | |
| 6,331,123 | B1 * | 12/2001 | Rodrigues | H01R 9/0524 439/584 |
| 6,884,115 | B2 * | 4/2005 | Malloy | H01R 9/0521 439/584 |
| 7,226,222 | B2 * | 6/2007 | Nagano | G02B 6/3897 385/88 |
| 7,296,939 | B2 * | 11/2007 | Sonoda | G02B 6/4204 385/88 |

(Continued)

FOREIGN PATENT DOCUMENTS

| KR | 10-0 358 031 B1 | 6/2002 |
| WO | 2005/081028 A1 | 9/2005 |

OTHER PUBLICATIONS

French Search Report, dated Dec. 6, 2016 from corresponding FR application.

*Primary Examiner* — Tina Wong
(74) *Attorney, Agent, or Firm* — Young & Thompson

(57) ABSTRACT

A connector joins the core of at least one optical fiber to the core of another fiber in a manner that is functional and leaktight against the external media, including: a cylindrical body, whose inner portion includes an insert provided with longitudinal through-holes or through-conduits; at least one optical linkage device including a cylindrical ferrule, generally made of ceramic, pierced for the passage of the core of the fiber, and a ferrule holder joined to the end of the associated fiber and providing the mechanical linkage between the ferrule and the insert; and an O-ring seal provided between the ferrule holder and the receiving conduit of the insert. The body of the connector and the insert form a monobloc assembly, either realized as a single piece or realized with the aid of two complementary pieces, fixed to each other in a totally leaktight or hermetic fashion.

11 Claims, 2 Drawing Sheets

(56) References Cited

U.S. PATENT DOCUMENTS

| | | | | |
|---|---|---|---|---|
| 7,369,716 B2 * | 5/2008 | Berg | ................. | G01V 11/00 |
| | | | | 385/12 |
| 7,722,259 B2 * | 5/2010 | Smith, III | ............ | G02B 6/3817 |
| | | | | 385/53 |
| 8,287,309 B1 * | 10/2012 | Thomas | ............... | H01R 9/0524 |
| | | | | 439/578 |
| 8,450,610 B2 * | 5/2013 | Alvelo | .................... | H01B 7/18 |
| | | | | 174/84 R |
| 2003/0230855 A1 | 12/2003 | Malone et al. | | |
| 2004/0120617 A1 | 6/2004 | Fournier et al. | | |
| 2005/0227545 A1 * | 10/2005 | Lahoreau | ................ | H01R 9/032 |
| | | | | 439/695 |

\* cited by examiner

LEAKTIGHT AND DISMOUNTABLE CONNECTOR FOR OPTICAL FIBRES

BACKGROUND OF THE INVENTION

Field of the Invention

The present invention concerns a connector for optical fibres, designed to provide the functional linkage between at least two respective ends of two optical fibres, and more particularly of two bundles of a plurality of optical fibres.

Description of the Related Art

An optical fibre provides for the transmission of a light signal, carrying information, from one point to another. When the distance between the emission and the reception of the light signal exceeds a given length, or when the fibres cross from one medium to another, for example liquid/air, the media being separated by a partition, it is then necessary to provide devices which ensure the functional continuity of the two sections of fibres to be connected, and these devices are known as connectors.

The known connectors for bundles of optical fibres comprise:
 a hollow body of generally cylindrical shape, advantageously provided with a middle disc and two threaded end portions;
 an insert formed from a cylindrical block, provided with longitudinal through-holes;
 at least one device designed to provide the optical linkage of one fibre end to another fibre end, the device comprising:
  a cylindrical ferrule, generally made of ceramic, pierced for the passage of the end of the fibre, and
  a ferrule holder to provide the mechanical linkage between the ferrule and the insert, as well as the ferrule holder and the elements of the optical fibre.

It is understood that the connectors need not only to provide the functional linkage between the fibres, but also to realize a leaktight or hermetic linkage. Leaktightness is measured by leakage rates, which are a function of the standards, the applications and the media located on either side of the connector. Leaktightness is measured as "index of protection" (IP). Hermeticity is measured by leakage rates, which should generally be between $1\times10^{-5}$ and $1\times10^{-9}$ atm·cm$^3$/s.

The leaktightness of such a connector needs to be assured in four zones or locations, namely between:
a) the partition and the connector, in a known manner by an O-ring seal in the area of the middle disc of the body of the connector;
b) the optical fibre and the end of the ferrule, in a known manner with the aid of a glue of the epoxy type;
c) the ferrule holder and the insert;
d) the insert and the body of the connector.

The known connectors ensure leaktightness in the above areas a) and b) in a satisfactory manner in terms of the current standards.

In order to ensure the leaktightness in the above area c), a sealing means of the glue type is provided in a known manner.

As a variant, the Korean patent KR 100358031B1 shows a connector whose ferrule holder is provided with an O-ring, the downstream connection portion being embedded by bonding, in order to ensure the leaktightness in the area d) above.

However, the known connectors, while ensuring leaktightness in a correct and satisfactory manner, are not dismountable, and thus do not allow access to the ferrule or the ferrule holders.

In the event of malfunctioning of a ferrule, a ferrule holder, or an optical fibre, for example, it is necessary to replace the entire connector, with the resulting financial consequences.

BRIEF SUMMARY OF THE INVENTION

The present invention remedies this situation and proposes a connector able to join together at least two ends of two respective optical fibres, so as to provide on the one hand a functional linkage, and on the other hand leaktightness or hermeticity of the connector and the fibres with respect to the respective media situated on either side of the connector, while allowing said connector to be disassembled for replacement or maintenance, especially that of the ferrule holder(s).

For this purpose, according to the invention, the connector able to join together at least two ends of two optical fibres in a manner that is functional and leaktight against the external media, of the type comprising:
 a body of generally cylindrical shape, whose inner portion, forming an insert, is provided with longitudinal through-conduits;
 at least one optical linkage device comprising:
  a cylindrical ferrule, generally made of ceramic, pierced for the passage of the core of the fibre, and
  a ferrule holder, on the one hand, designed to be joined to the end of the associated fibre and, on the other hand, designed to provide the mechanical linkage between the ferrule and the insert;
 an O-ring seal being provided between the ferrule holder and the corresponding through-conduit of the insert;
is characterized in that the body of the connector and the insert form a monobloc assembly, either realized as a single piece or realized with the aid of two complementary and associated pieces fixed to each other in a totally leaktight or hermetic fashion.

Thus, there is no leakage between the insert and the body, and it is not necessary to provide a seal by bonding between the different pieces of the connector, which allows access to the ferrule holders. The connector of the invention is thus hermetic.

Advantageously, the insert and the body are fixed to one another by welding or bonding over their entire respective contact surface.

The insert and the body are made of the same material, for example of stainless steel, or of aluminium, titanium, or composite, and preferably of stainless steel. As a variant, they can be made of two compatible materials, so as to allow them to be fixed to one another by welding, bonding or a similar technique.

Advantageously, two consecutive O-ring seals are provided on the ferrule holder, said O-ring seals being arranged spaced apart from one another longitudinally.

Thus, the ferrule holder equipped with the seals cooperates with the insert in a leaktight manner. The ferrule holder cooperates with the insert without bonding, unlike in the prior art. The ferrule holder is thus advantageously removable and able to be dissociated from the insert.

One of the seals is made of a material compatible with or suited to the first medium located on one side of the connector, while the second seal is made of a material compatible with or suited to the second medium located on the other side of the connector.

Thus, each seal is made of a material suited for ensuring optimal leaktightness with respect to the medium with which it is in contact.

The first O-ring seal is made in particular of fluorosilicone, while the second O-ring seal is made of fluorocarbon. The two seals, as a variant, can also be made of the same material.

The distance between the two O-ring seals is between 2.5 mm and 3.5 mm, and preferably of the order of 3 mm.

BRIEF DESCRIPTION OF THE DRAWINGS

The invention will be understood clearly in light of the following description of illustrative but nonlimiting examples, referring to the appended drawing, in which.

DETAILED DESCRIPTION OF THE PREFERRED EMBODIMENTS

Figure 1:
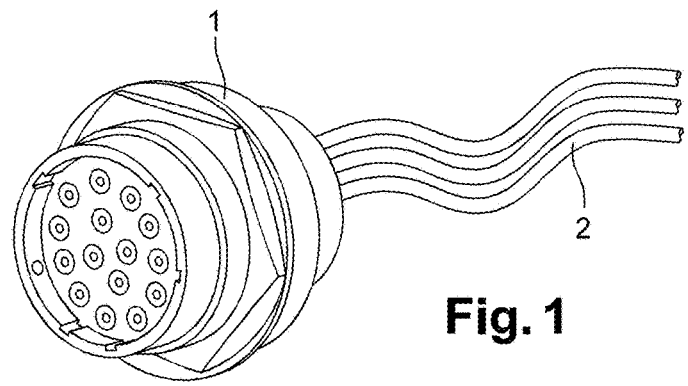
FIG. 1 is a frontal perspective view of a connector and a bundle of fibres.

In FIG. 1 there is represented in frontal perspective a connector 1 of the invention, connected to a bundle 2 of optical fibres at the rear, while the front face of the connector 1 has a wall from which protrude male elements (known as ferrules and explained below) designed to provide, with another set of ferrules arranged on another associated connector (not represented) the functional optical linkage of the respective ends of the fibres.

In a known manner, the respective ferrules of each connector are placed facing each other and in contact to provide the optical and functional linkage of the ends of the associated fibres.

Figure 2:
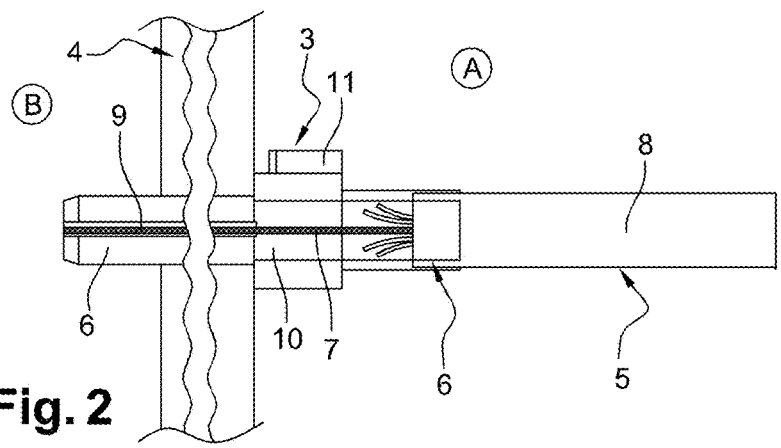
FIG. 2 is a schematic sectional view of an optical fibre, a ferrule and an associated ferrule holder.

The representation of FIG. 2 is schematic and corresponds to the prior art.

FIG. 2 shows in very schematic cross section a ferrule holder 3 passing through an internal partition 4 of a connector. The partition 4 separates a first medium A, such as a liquid, from a second medium B, such as air. For reasons of clarity, the internal partition 4 is represented with less width than it has in reality (in the plane of the figure).

The ferrule holder 3 connects the end of an optical fibre 5 and a ferrule 6. The optical fibre 5 comprises a core 7, which is centred.

The end of the fibre 5 comprises a sleeve 8 (also known as a "jacket") from which the core 7 protrudes said core downstream into the cylindrical ferrule 6, generally made of ceramic. The ferrule holder 3 comprises a cylindrical body through which passes the fibre core 7 which is housed in an internal conduit 9.

The end of the fibre 5 is embedded in glue 10, the latter also embedding the conduit 9 and enclosing the fibre core 7 up to the ferrule 6.

The ferrule holder 3 has an annular collar 11 of larger diameter, which is able to abut against one of the faces of the internal partition 4 of the connector.

It will be understood that the ferrule 6, as well as the other ferrules of the same connector (which are not represented), form an assembly of parallel male elements, designed (by their downstream end) to make contact and abut against another assembly of male elements, formed of identical ferrules, of another connector (not represented).

Figure 3:
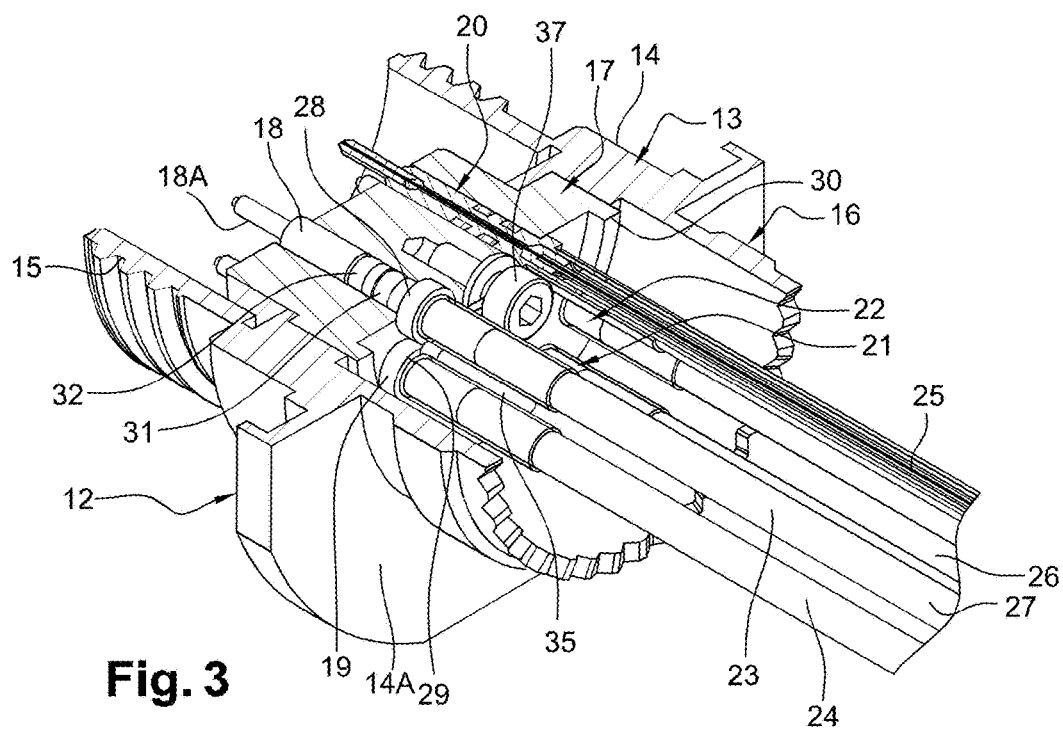
FIG. 3 is a perspective and partial sectional view along a diametric plane of the connector of the invention together with fibres.

In FIG. 3 and the following figures, the connector of the invention is shown, as well as its component elements, which are described below.

The connector 12 of the invention is represented in FIG. 3, in perspective and in exploded view in diametric cross section, together with optical fibres.

The connector 12 thus comprises a body 13 of generally cylindrical shape including:
a central bushing 14,
a middle disc 14A of larger diameter than the central bushing,
a threaded cylindrical front sleeve 15;
a cylindrical rear sleeve 16.

The body 13 is hollow in the embodiment illustrated.

In the central hollow space of the body 13 there is arranged a cylindrical insert 17 with outer diameter corresponding to the inner diameter of the central bushing 14. The insert 17 is arranged inside the hollow body in a tight fit.

The insert 17 has longitudinal holes or conduits passing through it, parallel to the longitudinal axis of the connector, said holes or conduits being around ten in number, for example.

The internal conduits of the insert 17 are able to receive and have pass through them cylindrical ferrule holders, only some of which are visible (due to the exploded view) and referenced as 18, 19 (partly seen), 20 (seen in cross section), and 21 and 22 (partly seen).

Each ferrule holder, at the rear, is associated with and connected to an optical fibre, respectively 23, 24, 25, 26 and 27, in the manner described in connection with FIG. 2.

On the side opposite the fibres (thus, toward the front portion), each ferrule holder is associated with a ferrule (18A for the ferrule holder 18) which protrudes from the front face of the insert 17.

In a known fashion, each ferrule holder comprises a collar of larger diameter, such as those visible and referenced respectively as 28, 29 and 30. The collars abut against the rear face, on the side with the optical fibres, of the insert 17.

Figure 8:
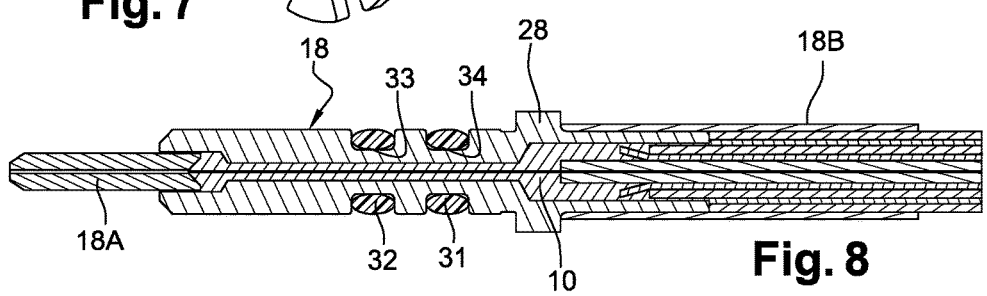
FIG. 8 is a longitudinal diametric sectional view of a ferrule holder, one end of fibres, and the associated ferrule.

According to the invention, and referring to FIGS. 3 and 8, each ferrule holder contains two consecutive O-ring seals, spaced apart longitudinally from each other and referenced, for the ferrule holder 18, respectively as first seal 31 and second seal 32.

The first and second seals 31 and 32 are housed in complementary grooves 33 and 34 of the body of the ferrule holder (FIG. 8), and extend diametrically from the ferrule holder. Thus, when the ferrule holder is put in place in the corresponding receiving conduit of the insert 17, the seals are compressed in the conduit, so as to provide the required leaktightness.

The first seal 31 is made of a material corresponding to the first medium situated on the rear side of the connector (on the side with the fibres), while the second seal 32 is made of a material corresponding to the second medium situated on the front side of the connector.

The respective media can be liquid (water, fuel, etc.) or gaseous (air, oxygen, nitrogen, etc.), depending on the applications and areas of use of the connectors of the invention.

Thus, each respective O-ring seal (first and second seals) is made of a material suited for ensuring optimal leaktightness with respect to the medium with which it is in contact.

As an example, the first O-ring seal is made of fluorosilicone, while the second O-ring seal is made of fluorocarbon.

The distance between the first and second O-ring seals (of the same ferrule holder) is between 2.5 mm and 3.5 mm, and preferably of the order of 3 mm.

Figure 7:
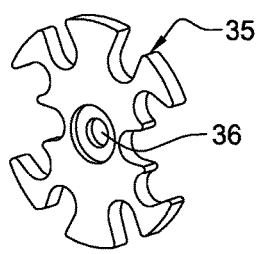
FIG. 7 is a perspective view of a guiding and locking plate of the ferrule holders.

Reference is now made to FIGS. 3 and 7. Once introduced into their receiving conduit of the insert 17, the ferrule holders are held on the insert by a plate 35 of generally circular star shape, comprising a central hole 36 designed for the passage of a screw 37 (FIG. 3) intended to be screwed onto the insert.

Figure 5:
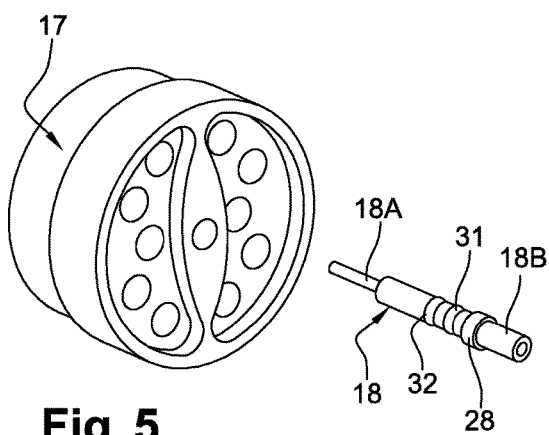
FIG. 5 is a perspective view of the insert of the connector of FIG. 4 and a ferrule holder.

The plate 35 for holding and fixing the ferrules holders has round-bottomed notches about its periphery, each of them being designed to receive the portion of the ferrule holder located just behind the collar. For example, for the ferrule holder 18, this portion is referenced as 18B (FIGS. 5 and 8). Thus, the plate 35 bears against each collar and holds the rear portions of the ferrule holders snug against the rear face of the insert 17 (FIGS. 3 and 6A).

Figure 4:
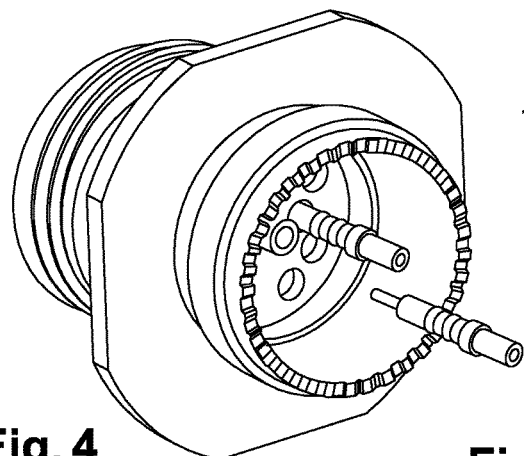
FIG. 4 is a perspective view of the connector of FIG. 3, the fibres having been removed.

FIG. 4 shows a perspective view of the connector of FIG. 3, and two ferrule holders (shown without the associated fibre) intended to be inserted into the insert.

Likewise, the insert 17 is shown alone in perspective in FIG. 5 with a ferrule holder intended to be inserted (shown without the fibre).

Figure 6A:
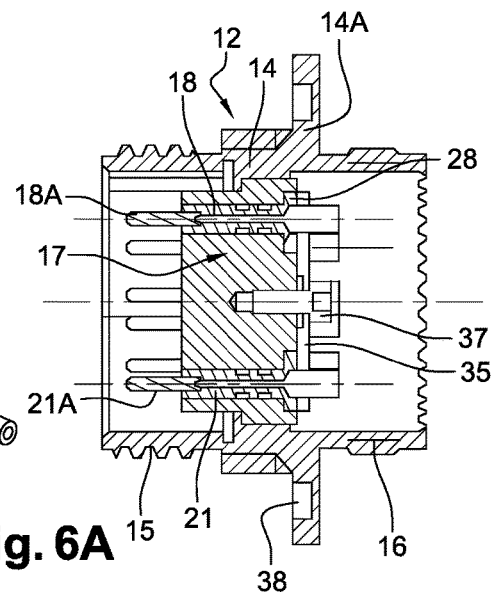
FIG. 6A is a diametric sectional view along a vertical plane of the connector of FIG. 4.
Figure 6B:
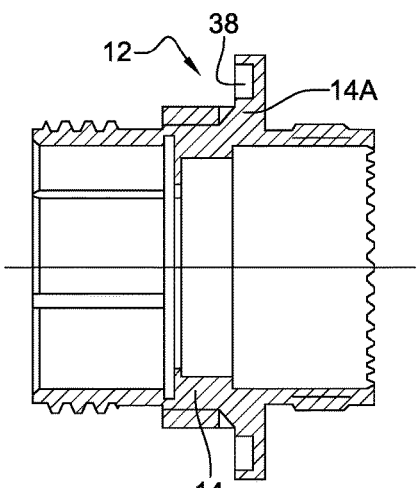
FIG. 6B represents only the body of the connector of FIG. 6A, without the insert or the ferrule holder.

In a known manner, as shown in FIGS. 6A and 6B, the body of the connector has on the outside a circular groove 38 in the middle disc 14A, open on the side opposite the fibres, and designed to receive an O-ring seal (not shown), ensuring the leaktightness between the connector and a panel or wall (not shown), for example of a tank, on which panel or wall the connector is secured, the front threaded portion 15 of the connector passing through a hole provided on said panel or wall.

In all of the figures, the body of the connector (shown in cross section in FIG. 6B, for example) is represented as hollow and distinct from the insert 17 (FIGS. 3, 5 and 6A), which only corresponds to one embodiment of the invention.

According to the invention, the body of the connector and the insert are secured and connected to each other in a leaktight and hermetic manner, by welding or bonding or a similar technique.

The body and the insert are preferably made of a metal suitable for welding, such as stainless steel.

According to one variant embodiment (not shown) of the invention, the body of the connector and the insert are made as a single piece, thus constituting a monobloc assembly.

Thus, the connector of the invention can be produced in two forms, the body of the connector and the insert being:
either composed of two distinct pieces, then secured and joined together hermetically;
or made in a single monobloc piece.

Thus, the invention provides a connector, according to one or the other of the two embodiments, which ensures:
total leaktightness (hermeticity) between the body and the insert; and adequate leaktightness, meeting the standards, thanks to the two O-ring seals on each ferrule holder, between the latter and the insert.

Besides the leaktightness properties, the connector of the invention is hermetic, i.e. impermeable, since it does not allow any fluid, such as liquid or gas, any particles, such as dust, or any odour to pass between the body and the insert.

Hermeticity is measured by leakage rates of the media located on either side of the connector, in particular of the body and the insert.

Thus, the hermeticity of the connector of the invention is between $10^{-5}$ atm·cm$^3$·s$^{-1}$, also PA·m$^3$·s$^{-1}$, and $10^{-9}$ atm·cm$^3$·s$^{-1}$, also PA·m$^3$·s$^{-1}$, in particular between $10^{-6}$ atm·cm$^3$·s$^{-1}$ and $10^{-9}$ atm·cm$^3$·s$^{-1}$.

The dismounting of the connector is easy, it being enough to unscrew the screw 37 (FIGS. 3 and 6A) to release the holding plate 35, in order to have access to each ferrule holder.

The invention claimed is:

1. A connector configured to join together, at least by one end, the core of one optical fiber to the core of another optical fiber in a manner that is functional and leaktight against external media, the connector comprising:
a body of generally cylindrical shape, having an inner portion forming a cylindrical insert provided with longitudinal through-conduits;
at least one optical linkage device comprising:
a cylindrical ferrule, generally made of ceramic, pierced for the passage of the core of the fiber, and
a ferrule holder configured to be joined to the end of the associated fiber and configured to provide a mechanical linkage between the ferrule and the insert, the ferrule holder being received and passing through an internal conduit of the cylindrical insert; and
an O-ring seal provided between the ferrule holder and the corresponding receiving conduit of the insert,
wherein the body of the connector and the insert form a monobloc assembly.

2. The connector according to claim 1, wherein the insert and the body are made of stainless steel.

3. The connector according to claim 1, wherein two consecutive O-ring seals are provided on the ferrule holder or on each ferrule holder, said O-ring seals being spaced apart from one another longitudinally.

4. The connector according to claim 3, wherein one of the O-ring seals is made of a material corresponding to the first medium located on one side of the connector, while a second of the O-ring seals is made of a material corresponding to the second medium located on the other side of the connector.

5. The connector according to claim 3, wherein the first O-ring seal is made of fluorosilicone, while the second O-ring seal is made of fluorocarbon.

6. The connector according to claim 3, wherein the distance between the two O-ring seals is between 2.5 mm and 3.5 mm.

7. The connector according to claim 2, wherein two consecutive O-ring seals are provided on the ferrule holder or on each ferrule holder, said O-ring seals being spaced apart from one another longitudinally.

8. The connector according to claim 4, wherein the first O-ring seal is made of fluorosilicone, while the second O-ring seal is made of fluorocarbon.

9. The connector according to claim 4, wherein the distance between the two O-ring seals is between 2.5 mm and 3.5 mm.

10. The connector according to claim 5, wherein the distance between the two O-ring seals is between 2.5 mm and 3.5 mm.

11. The connector according to claim 7, wherein the first O-ring seal is made of fluorosilicone, while the second O-ring seal is made of fluorocarbon.

\* \* \* \* \*